United States Patent
Kato et al.

(10) Patent No.: US 6,775,217 B1
(45) Date of Patent: Aug. 10, 2004

(54) MULTI-STAGE RING OSCILLATOR FOR PROVIDING STABLE DELAYS ON EFM DATA PULSES FOR RECORDING CD-R AND CD-RW MEDIUM

(75) Inventors: Keisuke Kato, Yamamoto (JP); Syed H. Husaini, Sunnyvale, CA (US); Weichi Ding, Fremont, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/572,865

(22) Filed: May 18, 2000

(51) Int. Cl.$^7$ .................................................. G11B 7/00
(52) U.S. Cl. ........................................ 369/59; 369/59.2
(58) Field of Search ............................ 369/59.12, 59.2, 369/59.23, 47.28

(56) References Cited

U.S. PATENT DOCUMENTS

| | | | |
|---|---|---|---|
| 4,532,561 A | | 7/1985 | Kimura et al. |
| 4,688,016 A | * | 8/1987 | Fok .............................. 341/59 |
| 5,189,657 A | | 2/1993 | Lee |
| 5,420,839 A | | 5/1995 | Tateishi |
| 5,438,300 A | | 8/1995 | Saban et al. |
| 5,684,760 A | | 11/1997 | Hunter |
| 5,757,735 A | * | 5/1998 | Fitzpatrick et al. ...... 369/13.54 |
| 5,912,574 A | | 6/1999 | Bhagwan |
| 5,923,628 A | | 7/1999 | Nogawa |
| 6,269,060 B1 | * | 7/2001 | Harvey et al. ............ 369/47.28 |
| 6,414,932 B1 | * | 7/2002 | Kaku et al. .................. 369/116 |
| 6,445,661 B1 | * | 9/2002 | Wu ............................ 369/59.2 |
| 6,469,969 B2 | * | 10/2002 | Carson et al. ............ 369/59.12 |
| 6,608,807 B1 | * | 8/2003 | Lee ........................... 369/59.26 |

* cited by examiner

*Primary Examiner*—Aristotelis M. Psitos
(74) *Attorney, Agent, or Firm*—Robert P. Bell; Steven A. Lin (57) ABSTRACT

The invention provides a method and apparatus for generating delays to shift edges of an EFM data stream from an EFM modulator for a CD-R and CD-RW write encoder. EFM data pulse edges may be delayed in increments of about 1/32 Tefm where Tefm is the code rate clock of an EFM data stream output. The delays are generated by a synthesizer running at four times the EFM code rate. The synthesizer may be built using a four-stage ring oscillator. Delays are selectable based upon the write strategy matrix in coarse increments of 1/4 T and fine increments of 1/32 T. For the coarse delay, the EFM data may be passed through a four stage shift register running at Fsynth, where Tefm=4× Fsynth, allowing for a coarse delay selection of 1/4 Tefm. The four stages of the ring oscillator provides eight phases of the synthesizer, each phase shifted by 1/8 Tsynth thereby providing a delay selection of 1/8 within each Tsynth period, translating into 1/32 Tefm resolution. The method and apparatus of the present invention may be extended to even finer delays by increasing the number of stages in the ring oscillator. Resulting delay increments would be Tefm/(2*N*M) wherein N is defined as the number of ring oscillator stages and M is the coarse delay.

22 Claims, 5 Drawing Sheets

MULTI-STAGE RING OSCILLATOR FOR PROVIDING STABLE DELAYS ON EFM DATA PULSES FOR RECORDING CD-R AND CD-RW MEDIUM

FIELD OF THE INVENTION

The present invention provides a method and apparatus for generating delays to shift edges of an EFM data stream from an EFM modulator for a CD-R (Compact Disc Recordable) and CD-RW (Compact Disc, Re-Writable) write encoder.

BACKGROUND OF THE INVENTION

In reading data from or writing data to a compact disc (CD), a number or series of pulses may be required in order to accurately read data from the disc or write data to the disc. Accuracy in generating these pulses is essential if data is to be properly read or written.

Prior art CD controlling circuits are known in the art, in which information is recorded in a PCM (pulse code modulation) format. Such devices are disclosed, for example, in U.S. Pat. No. 5,923,628, issued Jul. 13, 1999, U.S. Pat. No. 5,189,657, issued Feb. 23, 1993, or U.S. Pat. No. 4,532,561, issued Jul. 30, 1985, all of which are incorporated herein by reference.

Prior art CD systems may utilize a CD in which digital information is recorded in an EFM (eight-to-fourteen Modulation) format. In order to increase recording density, a CD may utilize CLV (Constant Linear Velocity) type encoding in which linear velocity of the disc is maintained at a constant speed regardless of where on the disc, from the inner periphery to the outer periphery, the signal is recorded. Therefore, rotational velocity of disc must be changed in accordance with the reading position in a radial direction of the disc. For this purpose, a control is carried out to calculate the present linear velocity from a synchronous signal pulse included in a signal read out from the disc, and to maintain linear velocity at a predetermined constant velocity.

In a CD modulation system, the frequency of a clock for providing reference signal CLK may be 4.3218 MHz, or a clock period of T=1/4.3218 MHz. Information may be recorded by patterns having the width (or duration) of three to eleven times of the clock period T (namely, 3T to 11T). This information recording is performed in units of one frame which is composed of 588 bits, namely, 588T, and an information recording region or section is so configured such that two or more maximum pattern widths of 11T are never contiguous.

Figure 1:
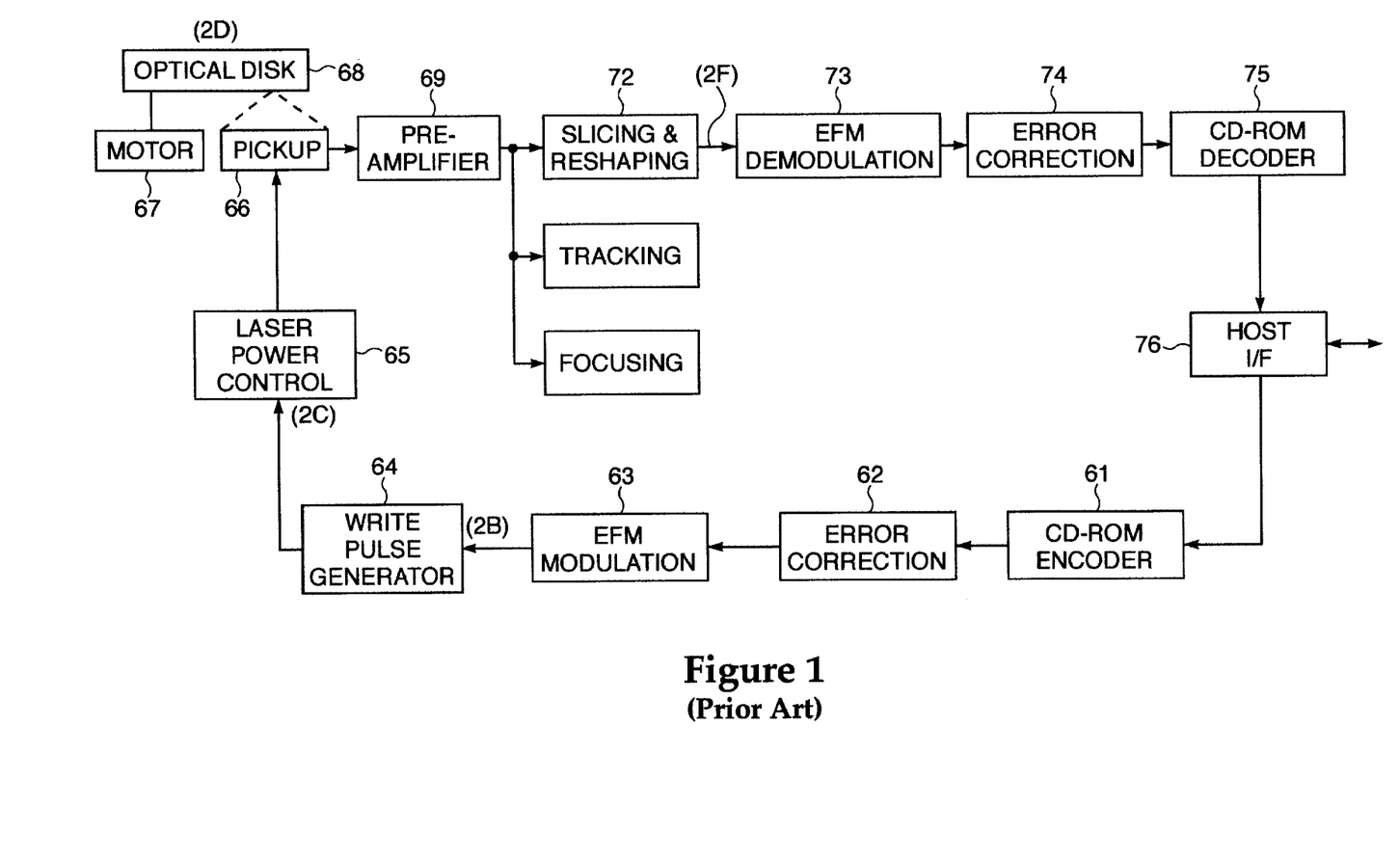
FIG. 1 is a schematic block diagram of a Prior Art writable compact disc system.

One Prior Art rewritable compact disc drive system is shown in a block diagram of FIG. 1. During a write sequence, digital data from a host processor (not shown) is transferred to CD-ROM encoder 61 via host interface 76. The digital data may be made into an 8-bit signal with an error correction bit in an error correction circuit 62, which is applied to an eight-to-fourteen modulation (hereinafter referred to as EFM) circuit 63. Then, the 14-bit EFM signal may be applied to a write pulse generator 64 from which output is sequentially written on the optical disc 68 through a laser power controller 65 and pickup 66.

In the read sequence, the pickup reads out the written signal from the disc to convert the signal into an electrical signal and then deliver the signal into a pre-amplifier 69 for amplifying to an adequate level. The amplified analog signal is then applied into a slicing and reshaping circuit 72, a tracking circuit 70 and a focusing circuit 71. The analog signal of the pre-amplifier is digitized in the slicing and reshaping circuit and is then applied to an EFM demodulation circuit 73 to obtain a demodulated EFM signal, which is input to a CD-ROM decoder 75 through an error correction circuit 74. CD-ROM decoder 75 may interface with a host processor (not shown) though host interface 76.

In this optical reproducing system however, a number of write pulses must be changed depending upon a duty period of logic high level of the EFM signal to be written onto the disc during the write operation. Moreover, the timing of such write pulses needs to be accurately controlled such that the pulses produce accurate patterns on the CD.

In the Prior Art, timing of such pulses was largely controlled through the use of fixed delay elements. Such fixed delay elements could be provided to delay writing pulses by predetermined amounts in order to synchronize such write pulses with the operation of the disc.

Variations in temperature, voltage, and process (e.g., the manufacturing process for the controller chip or chips) can produce variations in timing parameters in such prior art devices. Thus, a requirement remains in the art to provide a CD read/write controller which can accurately and consistently produce delays for read and write signals.

These variations were not as critical in early CD-R and CD-RW models running at 1×, 2×, and 4× speeds. However, as the speed of CD-R and CD-RW devices has increased to 8× and beyond, the timing of write pulses becomes more critical. Prior art delay generation techniques using fixed delays may not accurately generate delays in write pulses at such speeds, particularly with the variations due to temperature, voltage and process.

SUMMARY OF THE INVENTION

The present invention provides a method and apparatus for generating delays to shift edges of an EFM data stream from an EFM modulator for a CD-R and CD-RW write encoder. The EFM data pulse edges (CD-R is a single pulse modulation, CD-RW is a multiple pulse modulation) can be delayed in increments of about 1/32 Tefm where Tefm is the code rate clock of an EFM data stream output.

The method and apparatus of the present invention provides for generating robust and stable delays which are independent of temperature, voltage, and process variations. The delays are generated by a synthesizer running at four times the EFM code rate. The synthesizer may be built using a four-stage ring oscillator. Delays are selectable based upon the write strategy matrix in coarse increments of ¼ T and fine increments of 1/32 T.

For the coarse delay; the EFM data may be passed through a four stage shift register running at Fsynth, where Tefm= 4×Fsynth, allowing for a coarse delay selection of ½ Tefm. The four stages of the ring oscillator provides eight phases of the synthesizer, each phase shifted by ⅛ Tsynth thereby providing a delay selection of ⅛ within each Tsynth period, translating into 1/32 Tefm resolution. The advantage of this method is that delays may always be fixed with respect to the EFM code rate in 1/32 Tefm increments and are independent of variations in temperature, voltage, or process variations.

The method and apparatus of the present invention may be extended to even finer delays by increasing the number of stages in the ring oscillator. Resulting delay increments would be Tefm/(2*N*M) wherein N is defined as the number of ring oscillator stages and M is the coarse delay.

DETAILED DESCRIPTION OF THE INVENTION

Figure 2:
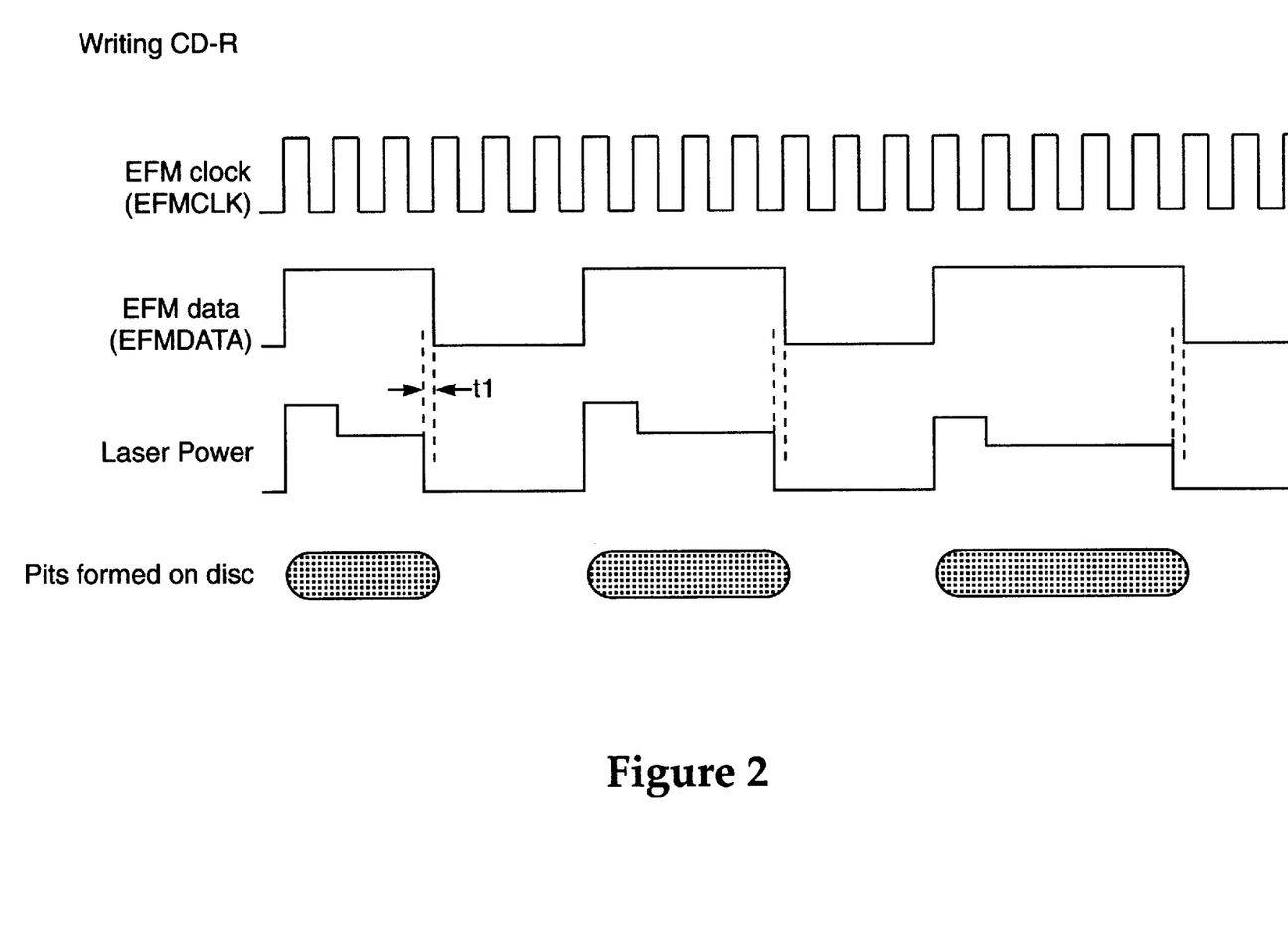
FIG. 2 is a waveform diagram illustrating the relationship between EFM clock, EFM data, laser power and pits when writing data in a CD-R.
Figure 3:
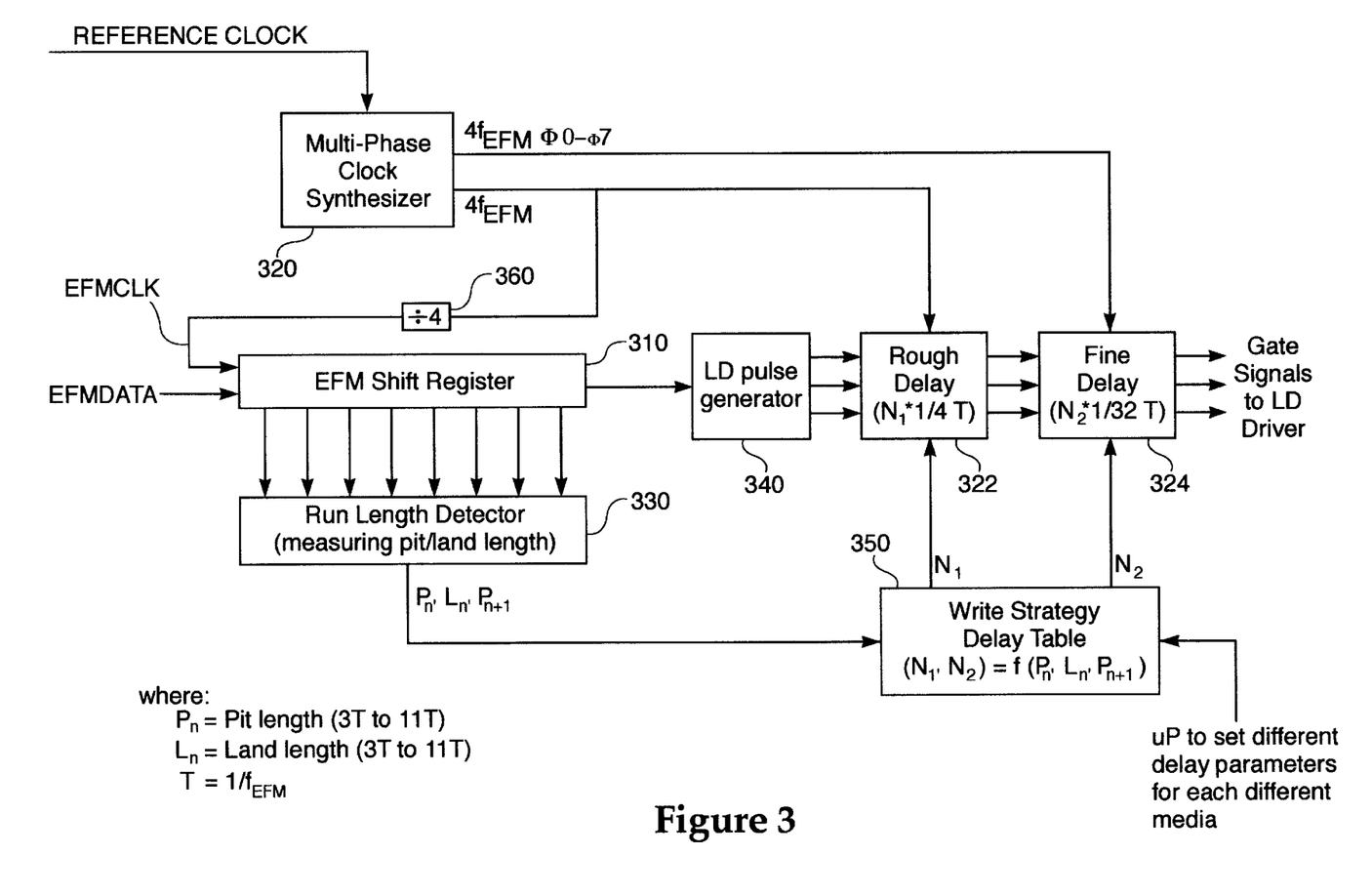
FIG. 3 is a block diagram of the controller of the present invention.
Figure 4:
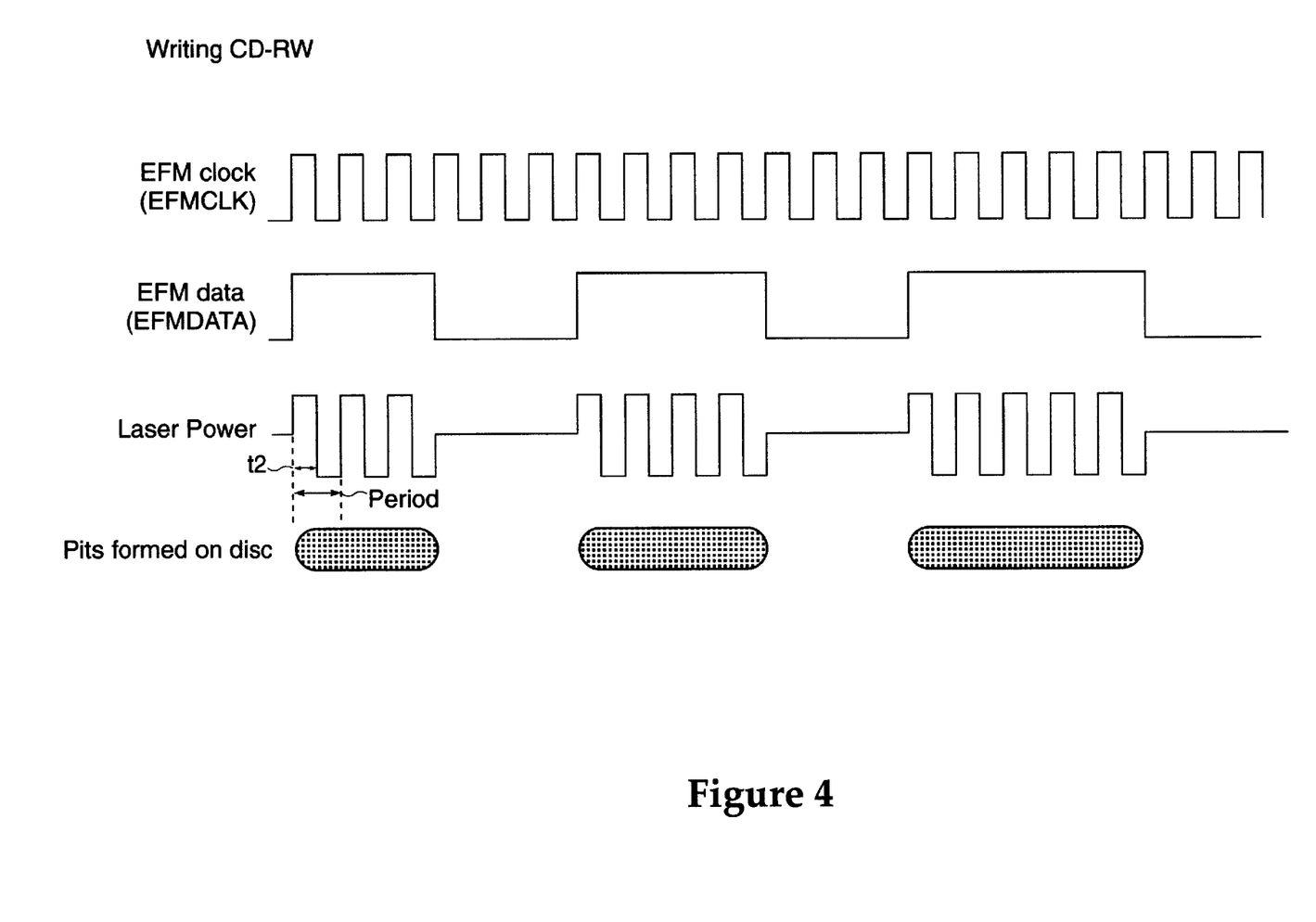
FIG. 4 is a waveform diagram illustrating the relationship between EFM clock, EFM data, laser power and pits when writing data in a CD-RW.

FIG. 3 is a block diagram of the controller of the present invention. FIGS. 2 and 4 are waveform diagrams illustrating the waveforms produced by the apparatus of FIG. 3 for CD-R and CD-RW, respectively. For the purposes of illustration, prior art elements of the apparatus of FIG. 4 are not shown. It will be understood to one of ordinary skill in the art that the circuitry of FIG. 4 may be applied to conventional CD control circuitry such as that disclosed in the Background of the Invention.

In FIGS. 2 and 4, the EFM clock signal (EFMCLK) is a write bit clock generated by an EFM modulator from a reference clock signal. The frequency of the EFM clock is generally 4.3218 MHz times the write speed (e.g., 1×, 2×, 4×, 8×, or the like). Thus, for example, if writing at 8× write speed, signal EFMCLK will have a frequency of 4.3218 MHz×8 or 34.5744 MHz.

Also in both FIGS. 2 and 4, signal EFM data (EFMDATA) comprises pit data generated by the EFM modulator (not shown). As noted above, the minimum size for each pit is 3T and the maximum size for each pit is 11T. Laser Power, in both FIGS. 2 and 4 represents the actual power signal applied to the laser diode during a write operation. For a CD-R, a single pulse may be used to write a pit. In a CD-RW, a multiple number of pulses may be used to write a pit. In the examples illustrated in FIGS. 2 and 4, both write data and pits formed on the disc are the same for both the CD-R and CD-RW. However, actual power profiles applied to the laser may be different between CD-R and CD-RW drives.

One of the critical timing controls while writing a CD-R and CD-RW disc is the timing delay t1 in a CD-R between the EFM data pulse and the laser writing pulse (See, e.g., FIG. 2) and the pulse duty cycle t2 of the laser writing pulse in a CD-RW (See, e.g., FIG. 3). The length of the duty cycle may determine the amount of power applied by the laser. Both types of delays have to be controlled within a very high resolution and have to be very stable. In the present invention, a multi-stage ring oscillator is used to provide these high-precision delays.

Referring now to FIG. 3, signal REFERENCE CLOCK is fed to multi-phase clock synthesizer 320 which in turn outputs a number of clock signals $4f_{EFM}\phi 0$–$\phi 7$. One of these clock signals may be fed through a divider 360 to produce signal EFMCLK. The arrangement for generating signal EFMCLK in FIG. 3 is by way of example only. Signal EFMCLK may be generated through an EFM modulator or the like within the spirit and scope of the present invention.

Signals EFMCLK and EFM from either FIG. 2 or FIG. 4 (depending upon application) may be fed to EFM Shift register 310. Signal EFMCLK is the EFM data clock and may be some multiple of the clock signal CLK as discussed above, where EFMCLK has a frequency of N*4.3218 MHz, where N is any integer number. Signal EFM comprises data in NRZI (Non-Return to Zero Interface) format from a data encoder. Signal EFM may be comprise a number of pulses (representing "pits" on the media) each having variable width of nT clock cycles, where n may vary from 3 to 11. In addition, signal EFM may be separated by a proportionate land (non-data) period having a length of mT clock cycles, where m may vary from 3 to 11.

Shift register 310 may store 30 bits (in the preferred embodiment) of EFM data and output a parallel signal to run length detector 330 which detects pit and land length values and outputs pit length $P_N$, and length $L_N$ and pit length $P_{N+1}$ for the next adjacent pit. In the illustrated embodiment, only present pit length $P_N$, next adjacent pit length $P_{N+1}$ and land length $L_N$ are shown as being calculated. However, other pit and land length data may be determined by shift register 310 and run length detector 330 within the spirit and scope of the present invention. For example, previous pit length $P_{N-1}$, previous land length $L_{N-1}$ may also be determined.

The reason these pit and land lengths need be determined is that timing of write pulses to the laser diode may need to be controlled with respect to these values. The exact timing of a particular laser pulse may depend upon a number of factors, including media type, laser type, general CD-R and CD-RW configuration, as well as the length of adjacent and present pits and lands.

The apparatus of the present invention is primarily intended to be embodied in a CD-R or CD-RW controller integrated circuit which may be integrated into a CD-R or CD-RW device manufactured by any one of a number of third parties. Thus, a mechanism is provided to allow third party users to program the device with particular timing information, as will be discussed below.

From the pit and land lengths, run length detector 330 may output an address to write strategy delay table 350. For a pit, land, and adjacent pit, (with lengths from 3 to 11T) a total of three bits each, or a total of 12 bits of address may be required. In actual practice, a number of delay values amy be repeated, and thus the address space may be reduced from 4K to 1K of space.

As noted above, multi-phase clock synthesizer 320 generates a first output clock signal in phase with clock signal EFMCLK, but having a frequency four times the clock signal EFMCLK, or $4f_{EFM}$. Multi-phase clock synthesizer 320 may also output second output clock signals, also having a frequency four times the clock signal EFMCLK, or $4f_{EFM}$, but in one of eight phase relationships with signal EFMCLK, as represented by $4f_{EFM}\phi 0$–$\phi 7$ (Note that signal $4f_{EFM}$ is equivalent to one of the eight phases $4f_{EFM}\phi 0$–$\phi 7$, e.g., $4f_{EFM}\phi 0$) In the preferred embodiment, clock synthesizer 320 may comprise a four-stage ring oscillator providing eight phases of the resulting output clock available for use.

The output of EFM shift register 310 outputs signal EFM in phase with clock signal EFMCLK. LD (laser diode) pulse generator 340 generates, at the EFMCLK frequency, undelayed EFM write pulses (not shown). LD pulse generator 340 may output signal EFM, but without delays t1 or t2. As noted above, delays may be less than the period T of clock signal EFMCLK. Moreover, delays t1 or t2 may be varied depending upon the length of the present pit, adjacent lands and pits, media type, speed (e.g., 1×, 2×, 4×, 8×, or the like), CD-R or CD-RW drive manufacturer and the like. Undelayed signal EFM may be fed through rough delay 322 and fine delay 324 to produce necessary delays t1 or t2.

Output $4f_{EFM}$ of multi-phase clock synthesizer 320 may drive rough delay 322, which may generate delays in increments of ¼ T. Outputs $4f_{EFM}\phi0-\phi7$ of multi-phase clock synthesizer 320 may drive fine delay 324, which may generate delays in increments of 1/32 T. Multi-phase clock synthesizer 320 may comprise a ring oscillator element which will be described in more detail below.

Selection of particular delay values for coarse and fine delays may be controlled by write strategy delay table 350. Write strategy delay table 350 may comprise a look-up table or the like and may be programmed (or be reprogrammable) by the drive manufacturer, end user, or software (preferably only by the drive manufacturer). Write strategy delay table may receive an address based upon pit and land length values $P_N$, $L_N$, and $P_{N+1}$ determined in run length detector 330. As noted above, other pit and land length values (e.g., $P_{N-1}$, $L_{N-1}$) or other combinations of pit and land length values may be utilized within the spirit and scope of the present invention. In the preferred embodiment, pit and land values $P_N$, $L_N$, $P_{N-1}$, $L_{N-1}$, $P_{N-1}$, and $L_{N+1}$ may be used to generate an address for write strategy delay table 350.

Based upon the address supplied from run length detector 330, write strategy delay table 350 may output coarse and fine delay values $N_1$ and $N_2$. The actual coarse and fine delay values for various combinations of pit and land values may be provided by a CD-RW manufacturer based upon experimental data or calculated theoretical values. As noted above, since these values will vary depending upon drive type, media type, and the like, write strategy delay table 350 allows for programmability of these values.

As illustrated in FIG. 3, a host microprocessor may supply media type information or other data which may be used in the selection of delay parameters $N_1$, and $N_2$. The term "host microprocessor" may refer to a microprocessor within a CD-R or CD-RW device, or a host processor within a computer system. Various data may be supplied through this data path to aid in the selection of delay parameters. For example, temperature data could be utilized to compensate delay values for variations in temperature or the like. Similarly, write speed, error rate, or other data could be utilized to fine tune the delay selection process.

Output delay control values $N_1$, and $N_2$ are fed to coarse and fine delays 322 and 324, respectively. Values $N_1$ and $N_2$ select the number of increments of coarse delay (¼ T) and fine delay (1/32 T), respectively. Note that the resultant delay produced by coarse delay 322 and fine delay 324 will be the sum of the two delays:

$$DELAY=(N_1*¼T)+(N_2*1/32T)$$

Note also that the delay times may be produced in succession. A first delay for the first pulse in signal EFM may differ from remaining delays in signal EFM. Thus, rough and coarse delays 322 and 324 may be clocked so as to produce a different delay for each pulse within signal EFM. Although illustrated as using two delay values, a single delay value for all pulses within signal EFM may be utilized. Similarly, separate and distinct delay values may also be provided for each pulse within signal EFM.

As may be readily appreciated by one of ordinary skill in the art, the scheme of FIG. 3 produces delays which are very accurately adjustable and controllable in response to a write strategy delay table. Compared to crude fixed delays of the Prior Art, the present invention provides a more accurate and robust means of providing a consistently reproducible delay. The method and apparatus of the present invention may be extended to even finer delays by increasing the number of stages in the ring oscillator. Resulting delay increments would be Tefm/(2*N*N) wherein N is defined as the number of ring oscillator stages.

Figure 5:
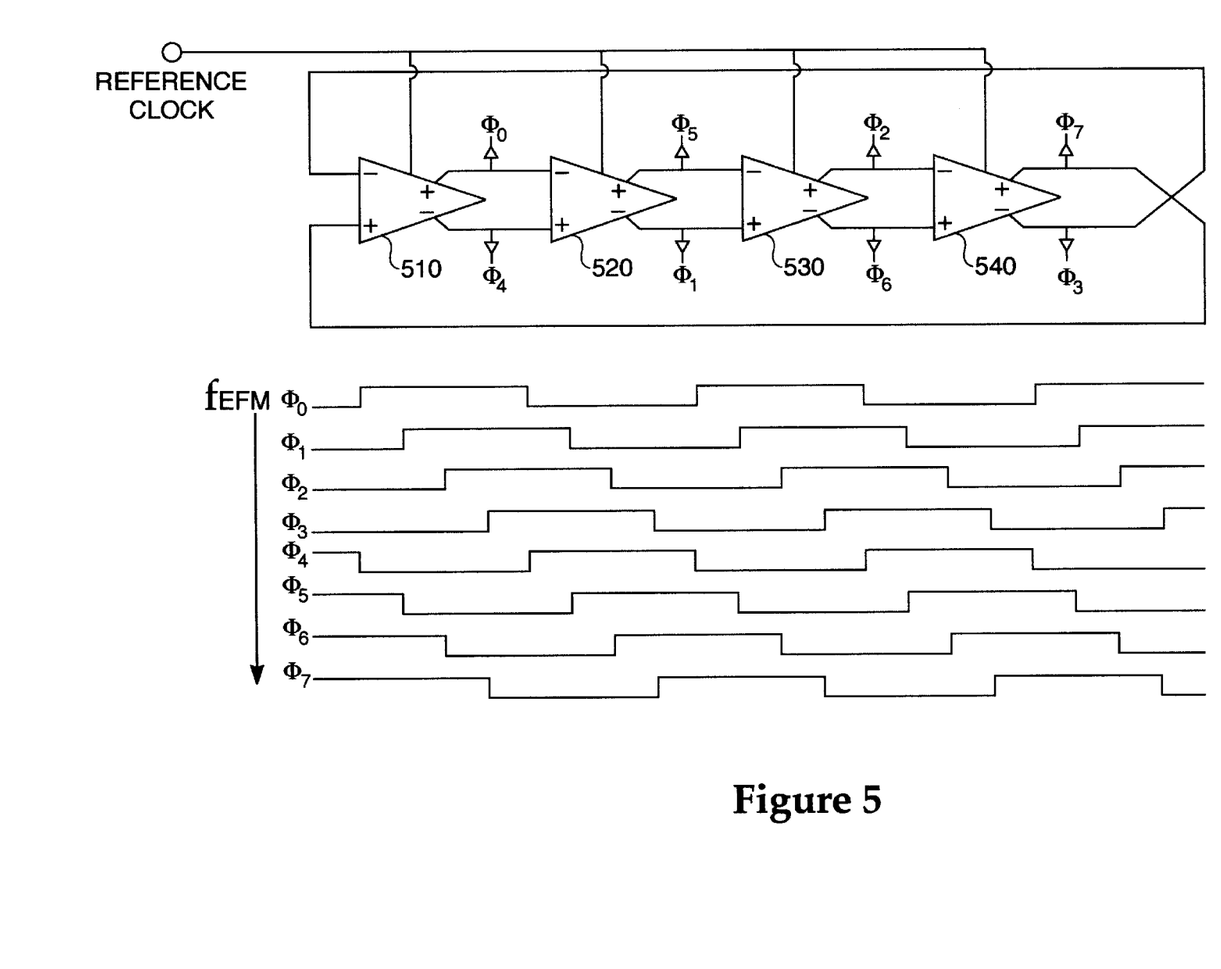
FIG. 5 is a block diagram and waveform diagram of the ring oscillator comprising multi-phase clock synthesizer 320 of FIG. 3.

FIG. 5 is a block diagram and waveform diagram of the ring oscillator comprising multi-phase clock synthesizer 320 of FIG. 3. Ring oscillator 500 includes differential amplifiers 510, 520, 530, and 540. Input REFERENCE CLOCK may be fed to amplifiers 510, 520, 530, and 540. Output signals $\phi_0$, $\phi_1\phi_2$, $\phi_3$, $\phi_4$, $\phi_5$, $\phi_6$, and $\phi_7$ may be output from various output stages of differential amplifiers 510, 520, 530, and 540 and may be used to generate output signals $4f_{EFM}\phi0-\phi7$. Any one of signals $4f_{EFM}\phi0-\phi7$ may be used for the rough delay clock signal $4f_{EFM}$. Examples of such ring oscillators are disclosed in U.S. Pat. No. 5,684,760 and U.S. Pat. No. 5,912,574, both of which are incorporated herein by reference.

The waveform diagram of FIG. 5 illustrates the phase relationship between each of the eight clock signals. As is illustrated in FIG. 5, each clock signal is ⅛ EFMCLK out of phase with an adjacent clock signal. As is known, to one of ordinary skill in the art, various phased clock signal elements $\phi_0$ $\phi_7$ may be summed or subtracted to produce a multiple clock signal having a frequency an even multiple of input clock signal $f_{EFM}$. Various phase relationships may be produced depending upon which clock signals are thus summed. Examples of the use of such ring oscillators for clock multiplying circuits is shown, for example, in Saban et al., U.S. Pat. No. 5,438,300, issued Aug. 1, 1995, and incorporated herein by reference.

While the preferred embodiment and various alternative embodiments of the invention have been disclosed and described in detail herein, it may be apparent to those skilled in the art that various changes in form and detail may be made therein without departing from the spirit and scope thereof.

For example, while disclosed herein as having both coarse and fine delays, it may be appreciated by one of ordinary skill in the art that a single coarse or fine delay may be used alone or in combination with other numbers of delays. Further, while the use of eight clock phases, four coarse delays and, 32 fine delays is disclosed as the preferred embodiment, it may be appreciated by one of ordinary skill in the art that the multi-phase clock synthesizer may output a plurality of 2x clock signals at a frequency multiple x of the reference clock signal, each of the plurality of clock signals having a phase difference from each of the other of the plurality of clock signals.

We claim:

1. An apparatus for generating a plurality of write signal pulses for a compact disc encoder, the apparatus comprising:

a multi-phase clock synthesizer, receiving a reference clock signal and outputting at least one multiplied clock signal at a multiple of the reference clock signal;

run length detecting means, for receiving the reference clock signal and a data signal, the data signal including a plurality of pulses representing pit groups of varying lengths, each of the plurality of pulses separated by lands of varying lengths, said run length detecting means determining run length of at least one data pulse, and generating an address based upon at least one data pit length and at least one land length;

a laser diode pulse generator, coupled to the run length detecting means, for receiving the data signal and generating at least one laser diode write pulse in proportion to pulse width of data signal pulses;

a write strategy delay table, coupled to the run length detecting means, for receiving the address and outputting at least one delay control signal; and at least one delay, coupled to the laser diode pulse generator, the multi-phase clock synthesizer, and the write strategy delay table, for receiving the at least one multiplied clock signal and the at least one delay control signal and delaying at least a portion of the at least one laser diode write pulse by an amount proportional to the product of the at least one delay control signal and the reference clock signal.

2. The apparatus of claim 1, wherein the multi-phase clock synthesizer comprises a multi-stage ring oscillator receiving the reference clock signal and outputting the plurality of clock signals each at a multiple n of the reference clock signal, each of the plurality of clock signals having a phase difference from each of the other of the plurality of clock signals.

3. The apparatus of claim 1, wherein the write strategy delay table comprises a look-up table addressed by the address, storing a corresponding at least one delay control signal at a corresponding address, the at least one delay control signal comprising a coarse delay control signal and a fine delay control signal.

4. The apparatus of claim 3 wherein said at least one delay comprises:

a coarse delay, coupled to the laser diode pulse generator, the multi-phase clock synthesizer, and the write strategy delay table, for receiving one of the plurality of clock signals and the coarse delay control signal and delaying at least one laser diode write pulse by an amount proportional to the product of the coarse delay control signal and the reference clock signal; and a fine delay, coupled to the coarse delay, the multi-phase clock synthesizer, and the write strategy delay table, for receiving the plurality of clock signals and the fine delay control signal and delaying at least one laser diode write pulse by an amount proportional to the product of the fine delay control signal and the reference clock signal.

5. The apparatus of claim 4, wherein the multi-phase clock synthesizer outputs a plurality of 2x clock signals at a multiple x of the reference clock signal, each of the plurality of clock signals having a phase difference from each of the other of the plurality of clock signals.

6. The apparatus of claim 5, wherein the coarse delay receives one of the plurality of 2x clock signals and delays at least one laser diode write pulse by an amount proportional to the product of the coarse delay control signal and $1/x$ of the reference clock signal.

7. The apparatus of claim 6, wherein the fine delay receives the plurality of 2x clock signals and delays at least one laser diode write pulse by an amount proportional to the product of the fine delay control signal and $1/(2x^2)$ of the reference clock signal.

8. The apparatus of claim 7, wherein $x=4$.

9. The apparatus of claim 2, wherein the run length detecting means outputs an address based upon at least one pit length, at least one land length, and at least one adjacent pit length.

10. The apparatus of claim 9, wherein the run length detecting means generates an address based upon at least one pit length, at least one land length, and at least two adjacent data pit length.

11. The apparatus of claim 2, wherein said run length detecting means comprises:

a shift register, for receiving the reference clock signal and the data signal, the data signal including a plurality of pulses representing pit groups of varying lengths, each of the plurality of pulses separated by lands of varying lengths, the shift register outputting the data signal serially and at least a portion of the reference clock signal in parallel; and a run length detector, coupled to the shift register, for receiving the portion of the reference clock signal output from the shift register in parallel, determining run length of at least one data pulse, and outputting at least a pit length.

12. A method for generating a plurality of write signal pulses for a compact disc encoder, the method comprising the steps of:

receiving, in a multi-phase clock synthesizer, the reference clock signal, outputting, from the multi-phase clock synthesizer, at least one multiplied clock signal at a multiple of the reference clock signal, determining, in a run length detector, a run length of a data signal, the data signal including a plurality of pulses representing pit groups of varying lengths, each of the plurality of pulses separated by lands of varying lengths, outputting, from the run length detector, an address based upon at least a data pit length and at least one land length, generating, in a laser diode pulse generator, at least one laser diode write pulse, each laser diode write pulse proportional to pulse width of data signal pulses, receiving, in a write strategy delay table, the address, outputting, from the write strategy delay table, at least one delay control signal, and delaying, in at least one delay coupled to the laser diode pulse generator, the multi-phase clock synthesizer, and the write strategy delay table, in response to the at least one multiplied clock signal and the at least one delay control signal, at least a portion of the at least one laser diode write pulse by an amount proportional to the product of the at least one delay control signal and the reference clock signal.

13. The method of claim 12, wherein the multi-phase clock synthesizer comprises a multi-stage ring oscillator, and said step of outputting at least one multiplied clock signal comprises the step of outputting the plurality of clock signals each at a multiple x of the reference clock signal, each of the plurality of clock signals having a phase difference from each of the other of the plurality of clock signals.

14. The method of claim 12, wherein the write strategy delay table comprises a look-up table addressed by the address, storing a corresponding at least one delay control signal at a corresponding address, said step of outputting at least one delay control signal comprises the steps of outputting a coarse delay control signal and outputting a fine delay control signal.

15. The method of claim 14 wherein the at least one delay comprises a coarse delay and a fine delay, and said step of delaying comprises the steps of:

receiving, in the coarse delay, coupled to the laser diode pulse generator, the multi-phase clock synthesizer, and the write strategy delay table, one of the plurality of clock signals and the coarse delay control signal, delaying, in the coarse delay, at least one laser diode write pulse by an amount proportional to the product of the coarse delay control signal and the reference clock signal, receiving, in the fine delay coupled to the coarse delay, the multi-phase clock synthesizer, and the write strategy delay table, the plurality of clock signals and the fine delay control signal, and delaying, in the fine delay, at least one laser diode write pulse by an amount proportional to the product of the fine delay control signal and the reference clock signal.

16. The method of claim 15, wherein said step of outputting at least one multiplied clock signal comprises the step of outputting, from the multi-phase clock synthesizer, a plurality of 2x clock signals, at a multiple x of the reference clock signal, each of the plurality of clock signals having a phase difference from each of the other of the plurality of clock signals.

17. The method of claim 16, wherein said step of receiving, in the coarse delay, comprises the step of receiving one of the plurality of 2x clock signals, and wherein said step of delaying, in the coarse delay, comprises the step of delaying at least one laser diode write pulse by an amount proportional to the product of the coarse delay control signal and 1/x of the reference clock signal.

18. The method of claim 17, wherein said step of receiving, in the fine delay, comprises the step of receiving the plurality of 2x clock signals, and wherein said step of delaying, in the fine delay, comprises the step of delaying at least one laser diode write pulse by an amount proportional to the product of the fine delay control signal and $1/(2x^2)$ of the reference clock signal.

19. The method of claim 18, wherein x=4.

20. The method of claim 14, wherein said step of outputting, from the run length detector comprises the step of outputting an address based upon at least one pit, at least one land, and at least one adjacent pit.

21. The method of claim 20, wherein said step of outputting, from the run length detector comprises the step of outputting an address based upon at least one pit length, at least one land length, and at least two adjacent pit lengths.

22. The method of claim 13, wherein said step of measuring run length comprises the steps of:

receiving, in a shift register, a reference clock signal and a data signal, the data signal including a plurality of pulses representing pit groups of varying lengths, each of the plurality of pulses separated by lands of varying lengths, outputting, from the shift register, the data signal serially and a portion of the reference clock signal in parallel, receiving, in a run length detector coupled to the shift register, the portion of the reference clock signal output from the shift register in parallel, determining, in the run length detector, run length of at least one data pulse, and outputting, from the run length detector, at least a pit length.

* * * * *